United States Patent
Atawneh

(10) Patent No.: US 8,947,702 B2
(45) Date of Patent: Feb. 3, 2015

(54) ENGINE OPTIMIZATION

(75) Inventor: Hazim Atawneh, Hayward, CA (US)

(73) Assignee: Electronics for Imaging, Inc., Fremont, CA (US)

( * ) Notice: Subject to any disclaimer, the term of this patent is extended or adjusted under 35 U.S.C. 154(b) by 493 days.

(21) Appl. No.: 13/237,785

(22) Filed: Sep. 20, 2011

(65) Prior Publication Data
US 2013/0070287 A1 Mar. 21, 2013

(51) Int. Cl.
G06F 3/12 (2006.01)
G06K 15/02 (2006.01)

(52) U.S. Cl.
CPC .......... G06K 15/1823 (2013.01); G06F 3/1211 (2013.01); G06F 3/1263 (2013.01); G06F 3/1285 (2013.01)
USPC ....... 358/1.15; 358/1.14; 358/1.13; 358/1.16; 358/1.18; 399/82; 705/7.26; 718/101

(58) Field of Classification Search
None
See application file for complete search history.

(56) References Cited

U.S. PATENT DOCUMENTS

| 6,678,065 | B1 * | 1/2004 | Hikawa | 358/1.13 |
| 6,999,188 | B1 | 2/2006 | Ashe | |
| 8,384,927 | B2 * | 2/2013 | Harmon et al. | 358/1.15 |
| 8,468,527 | B2 * | 6/2013 | Rai | 718/101 |
| 8,599,405 | B2 * | 12/2013 | Mandel | 358/1.15 |
| 2003/0076525 | A1 | 4/2003 | Hikawa | |
| 2006/0193006 | A1 | 8/2006 | Lawrence et al. | |
| 2010/0238505 | A1 | 9/2010 | Lofthus et al. | |

OTHER PUBLICATIONS

Print Optimization Strategies; http://unitedsystemsok.com/print-optimization-strategies; United Systems of Oklahoma, Oklahoma City, OK; Aug. 2011.

* cited by examiner

Primary Examiner — Paul F Payer
(74) Attorney, Agent, or Firm — Michael A. Glenn; Perkins Coie LLP

(57) ABSTRACT

Techniques are provided that include a workflow that optimizes print job execution by automatically categorizing and sorting requests into different configurations, respectively, for print operators, regular users, and the like.

12 Claims, 4 Drawing Sheets ( Highlights a job that won't print due to engine configuration mismatch. )

( Highlights a job that meets current engine configuration. )

(Highlights a job that won't print due to engine configuration mismatch.)

(Highlights a job that meets current engine configuration.)

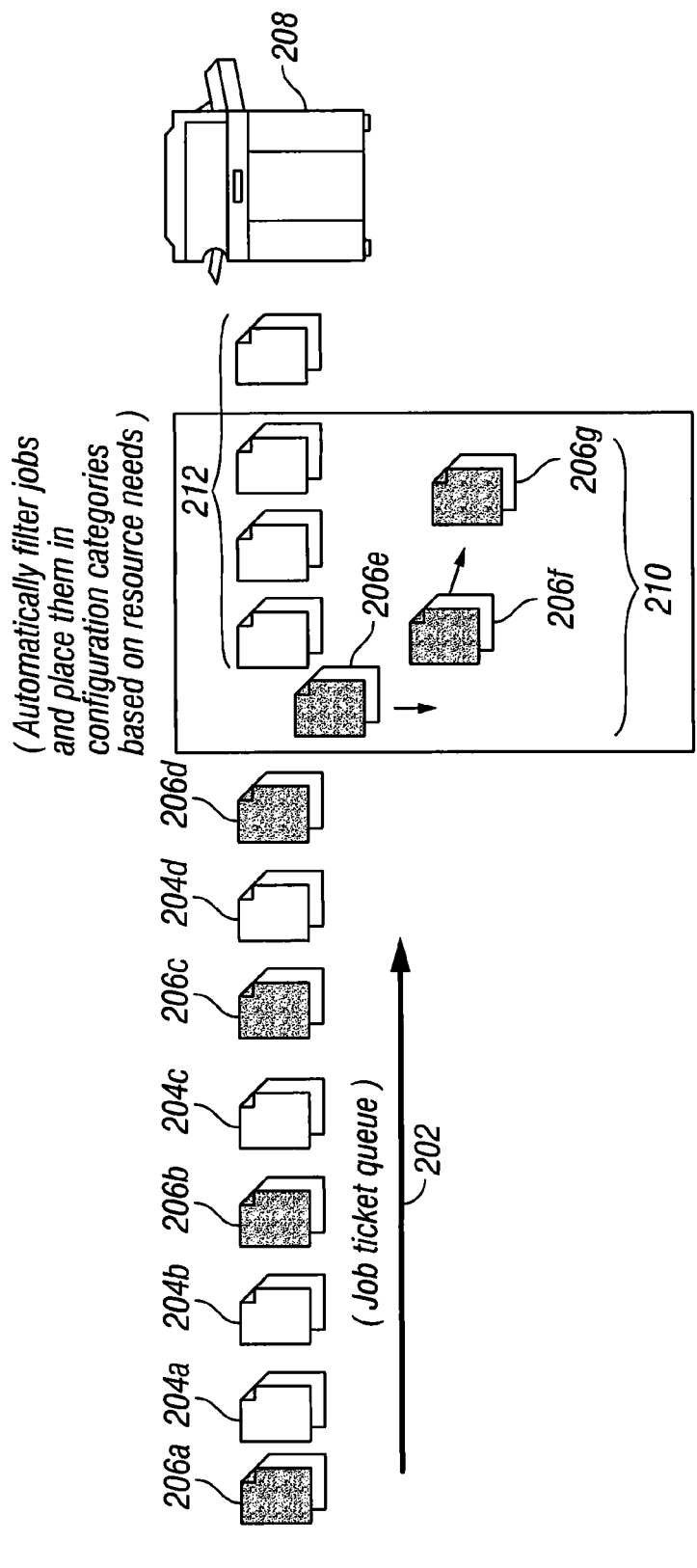
FIG. 2
 (Highlights a job that won't print due to engine configuration mismatch.)
 (Highlights a job that meets current engine configuration.)

ENGINE OPTIMIZATION

BACKGROUND OF THE INVENTION

1. Technical Field

This invention relates generally to the field of digital printing machines. More specifically, this invention relates to automatically optimizing print job execution on digital printing machines by automatically categorizing requests into different configurations.

2. Description of the Related Art

The printing industry has evolved from the days of small to medium-sized or larger printing shops having relatively uncomplicated printers, such as for example, ink jet printers, where such printers accommodate a seemingly limited number of attributes, such as feeding one size of paper, for example. Technology has advanced such that mid-size copiers are readily available. These mid-size copiers typically support a wide variety of attributes. For example, such mid-size copiers may accommodate multiple sizes of paper, multiple media or types of paper, staples, and so on. It should be appreciated that the numerous varieties in printer attributes may vary as much or more than the varieties of models of present printers and future printers. As well, many models of printers, for example, such mid-size copiers, typically are available to production sites where operators perform the manual job of sorting the print jobs before printing. For example, such operators may manually sort particular jobs according to, but not limited to, paper sizes and types of paper. Presently, it has been found that having such printers, such as mid-size copiers, in the office environment is more of the norm. As well, the print shop industry is thriving and as prosperous as ever before.

Because today's print engines have the capability of doing more than previously envisioned, current related practices may be out-of-date.

SUMMARY OF THE INVENTION

Techniques are provided which include a workflow that optimizes print job execution by automatically categorizing and sorting requests into different configurations, respectively, for print operators, regular users, and the like.

BRIEF DESCRIPTION OF THE DRAWINGS

FIG. 2 is a schematic diagram showing the workflow of a printing process that does not cause delay, according to an embodiment;

DETAILED DESCRIPTION OF THE INVENTION

Techniques are provided which include a workflow that optimizes print job execution by automatically categorizing and sorting requests into different configurations, respectively, for print operators, regular users, and the like. For purposes of discussion herein, configuration means a particular printing state of a printer for the incoming print requests until the configuration is changed. For example, a particular configuration of a printer may include a particular paper size and a particular media, e.g. A4 Heavyweight. As another example of a printer configuration, such configuration may include A4 Heavyweight and staples. It should be appreciated that one skilled in the art would readily recognize that what a configuration includes may be at least as varied as the types of printing machines, past, present or future, and that the aforementioned details are by way of example only and are not meant to be limiting. Also, for purposes of discussion herein, a typical print job or job ticket may comprise, but is not limited to: paper size, media type, media weight, any finishing options, number of copies, feed direction, staples, information related to the data to be printed, and so on.

Background

For purposes of discussion herein, the basic understanding of a printer is as follows. Physically, a typical printer is one unit with four to five trays for placing the paper. For each printer, typical printer drivers support a variety of attributes including, but not limited to 14 or 15 types of paper sizes and media, finishing options and so on. However, it may be that not all attributes supported by a printer driver can be accommodated by the printer at a same time or setting. For example, it may be that the 14 or 15 types of paper and media cannot be allocated physically on a same unit at one time. Thus, even when processors may be configured to support these types of papers, human operators may constantly have to configure their printer or copier manually to meet the needs of their print jobs. Today digital print operators optimize usage of their print devices by manually reviewing each job, sorting the reviewed jobs, and based on the sorting, changing configurations to print each such job. Typically, when a print engine does not have the resources to print a particular print job, for example is not configured for the particular print job, the printing process is held up until the resources are allocated. It should be appreciated that the above described pre-printing activity of the operator may be labor-intensive and time-consuming.

Figure 1:
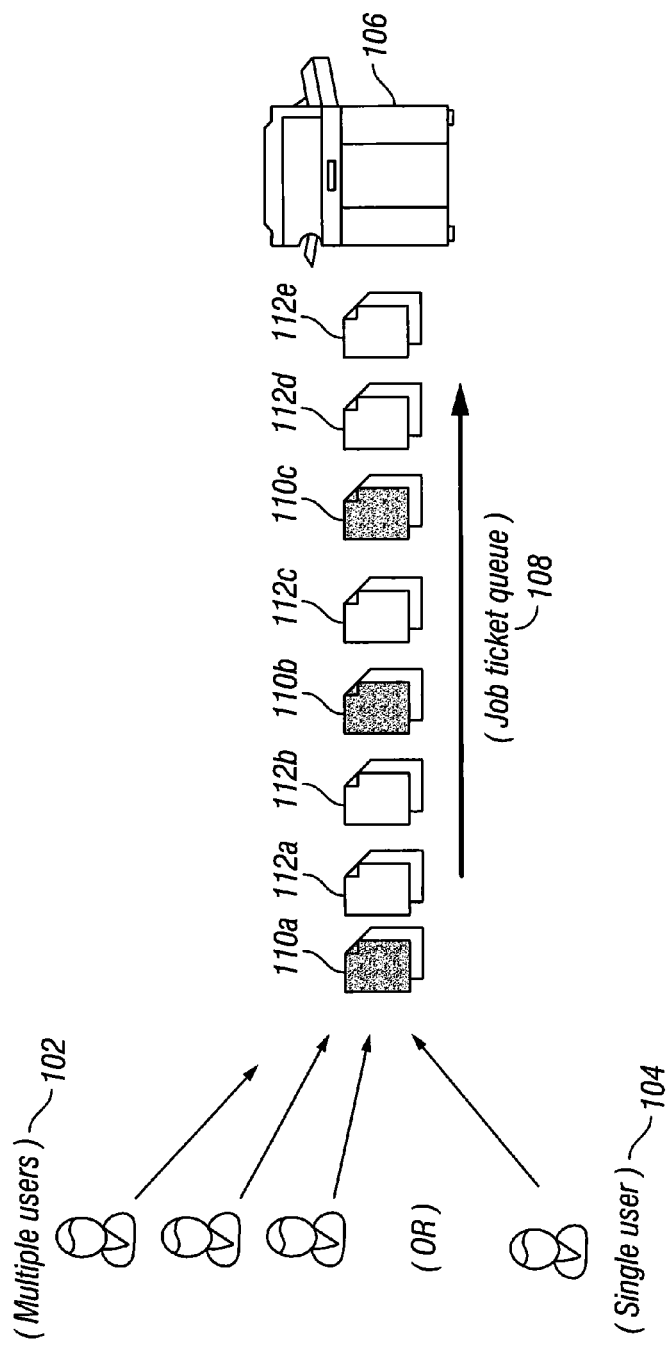
FIG. 1 is a schematic diagram showing the workflow of a printing process that causes delay, according to the prior art.
Figure 1:
Figure 1:

Further, the process of operators sending different types of print jobs to the printer engine and manually changing the media and the paper sizes is a very inefficient workflow. An example of such workflow can be understood with reference to FIG. 1, a schematic diagram showing the workflow of a printing process that causes delay, according to the prior art. Multiple users 102 or a single user 104 send various print jobs to a printer engine ("engine") 106. As shown in FIG. 1, the various print jobs are allocated into a job ticket queue for printing by engine 106. It should be appreciated that engine 106 has a current configuration (not shown). And, not all of the print jobs in job ticket queue 108 are configured for the current configuration. For example, print jobs 110a, 110b, and 110c are configured differently than the configuration of engine 106. Print jobs 112a-112e are configured for engine 106. Thus, in accordance with the example, when print jobs 112e and 112d reach engine 106, because they have the same configuration as engine 106, print jobs 112e and 112d will print. However, when print job 110c reaches engine 106, because engine 106 is not configured for print job 110c, the printing process stops. The printing process stays inactive until an operator manually changes the configuration of engine 106 to match print job 110c. For example, suppose engine 106 is loaded with 8.5 by 11 size paper. Suppose further that print job 110c requires 11 by 17 size paper. The operator has to hold print job 110c, open the paper tray, change the paper from 8.5 by 11 to 11 by 17 and by doing so holds up the remaining print jobs. Once the operator changes the configuration of engine 106 to match print job 110c, engine 106 successfully prints out print job 110c. Continuing with the example, the next print job to print is print job 112c. As can be seen from the figure, print job 112c has a configuration that is different from that of engine 106, which had been configured for print job 110c. Again, the printing process stops. Again, the operator is required to change the configuration of engine 106 manually to match the configuration of print job 112c. Once the operator changes the configuration of engine 106, engine 106 prints out print job 112c. This process, and the necessity of the operator to intervene at each successive and different print job configuration continues until all print jobs are printed. It should be appreciated that this printing process may be very inefficient, reasons including that the delays in printing may lose time.

Moreover, suppose a print shop uses three operators and one printer engine. Suppose further that there are 10 print jobs that need to be printed. The first job requires heavyweight. The operator sends that print job the engine. The printer may stop printing and prompt the operator with a message, such as, "Missing Media. Please load A4 heavyweight." In this print shop, the whole printing sequence is blocked. That is, the whole printing sequence is blocked for all three operators until someone provides the needed media, such as placing it in the correct tray. It should be appreciated that when a print shop has many different paper sizes and operators keep sending unique print jobs to the engine, the print queue may be stopped or held up many, many times while waiting for an operator to change the paper and the like. And, because the printer may have four to five trays, every time an operator switches a tray to a different media, the operator is potentially blocking a future job as well.

Thus, it would be advantageous to reduce or try to eliminate such type of block in a printing sequence, which may drastically increase or optimize the number of print jobs that could print during the same time frame.

Overview

In an embodiment, an operator may send many different types of print jobs to a printer engine, regardless of how the print engine is configured to function at that time, i.e. although the printer may be capable of printing on a particular media and paper size, for instance, that media and paper size may not physically be in the engine. For example, the operator may send print jobs of different paper sizes and different media. The embodiment takes the print jobs that match the existing paper and media loaded in the engine and prints out those print jobs. The print jobs that do not have the correct paper and media loaded in the engine are put in a wait queue. While in the wait queue, the embodiment sorts and organizes or categorizes those print jobs according to their respective configurations.

An embodiment may be understood with reference to FIG. 2, a schematic diagram showing an example workflow of a printing process that does not cause delay. In the example, a job ticket queue 202 for a print engine 208 comprises two different types of print jobs. For instance, job ticket queue 202 may contain a few print jobs that require A4 (204a-204d) and a few print jobs that may require 11×17 (206a-206d). Because engine 208 does not have 11×17 paper loaded in it currently, 11×17 print jobs (206e-206g) are put in a wait queue 210 and sorted by the paper size.

In an embodiment, for each job ticket that arrives at a processor in printer engine 208, before or at rip time, the processor parses the job. The processor reads and determines the paper size and the media of the job and checks the paper physically available in engine 208. Based in part on the reading and the checking, the processor either sends the job ticket to a print queue 212 or re-routes, without user interaction, that job ticket to wait queue 210. It should be appreciated that presently, customers have the ability to send print jobs to print, hold, or direct queues. This ability may be accomplished, for example, via Fiery print drivers, Fiery utilities, such as Command WorkStation, or WebTools, all by Electronics for Imaging, Inc. It should further be appreciated that sending print jobs to print, hold, or direct queues is based on manual selection.

In an embodiment, if an operator continuously sends additional 11×17 print jobs to engine 208, these jobs are put together in one configuration in wait queue 210. After a predetermined limit or threshold, e.g. after a particular amount of print jobs have collected in wait queue 210, the embodiment may issue a notification that the limit has been reached. For example, the system may notify the operator or may prompt the operator to take action. For example, an embodiment may present the operator with a message indicating "Hello! You have 10 jobs that are 11×17 and 20 jobs that are B5." Thus, in response to the notification, the operator may change the printer configuration of engine 208 to include 11×17 and B5. In this example, after changing the configuration to 11×17 and B5, the operator is able to execute the 30 jobs at once.

In an embodiment, the above-described predetermined limit may be customizable. Thus, when said predetermined limit is reached, the system may issue a notification that said limit has been reached. As well, the system may perform a predetermined course of action upon determining that the predetermined limit has been reached. For example, a business may view that having 10 print jobs waiting is enough to change the configuration and is efficient for them. Thus, such business may set the limit to 10. As another example, a business may set the limit to 20 or 40 at another time, and so on. As well, the predetermined limit may be a time limit. For example, users may also employ a time limit feature, by which a time limit may be set to either hours or days, based on the users' discretion. The same dynamics may apply as with the print job limits. Thus, for example, a user may set the time limit to four hours. Then, every four hours a message may appear indicating what print jobs may be available to print if the configuration of the engine is changed, accordingly. In an embodiment, the user may have a choice to opt-out and continue for another four hour cycle on the existing configuration.

It should be appreciated that embodiments described herein include automating the optimization process or behavior. That is, an embodiment automates taking print jobs that require particular attributes for example including, but not limited to, paper or media, that are not currently present in a printer or for which the printer is not currently configured, and placing such print jobs in a wait queue without requiring operator or any type of user intervention. For instance, operators do not have to worry about the paper and media that are present in the print engine when they send print jobs to the engine; it's one issue they do not have to worry about. Importantly, whatever customers bring in to a print shop, the corresponding operators may send the corresponding print job worry-free, because embodiments described herein automate the workload to the engine. Whatever print jobs match the current configuration of the print engine are printed with no issue. The print jobs that require a changed configuration, such as require new paper or media, are held in a wait queue until a predetermined threshold is set, such as for example, until there is at least a particular number of print jobs in the wait queue. Then, at or after such limit, operators may change the configuration at the engine and print the additional print jobs that were waiting in the wait queue.

An Example User Interface

Figure 3:
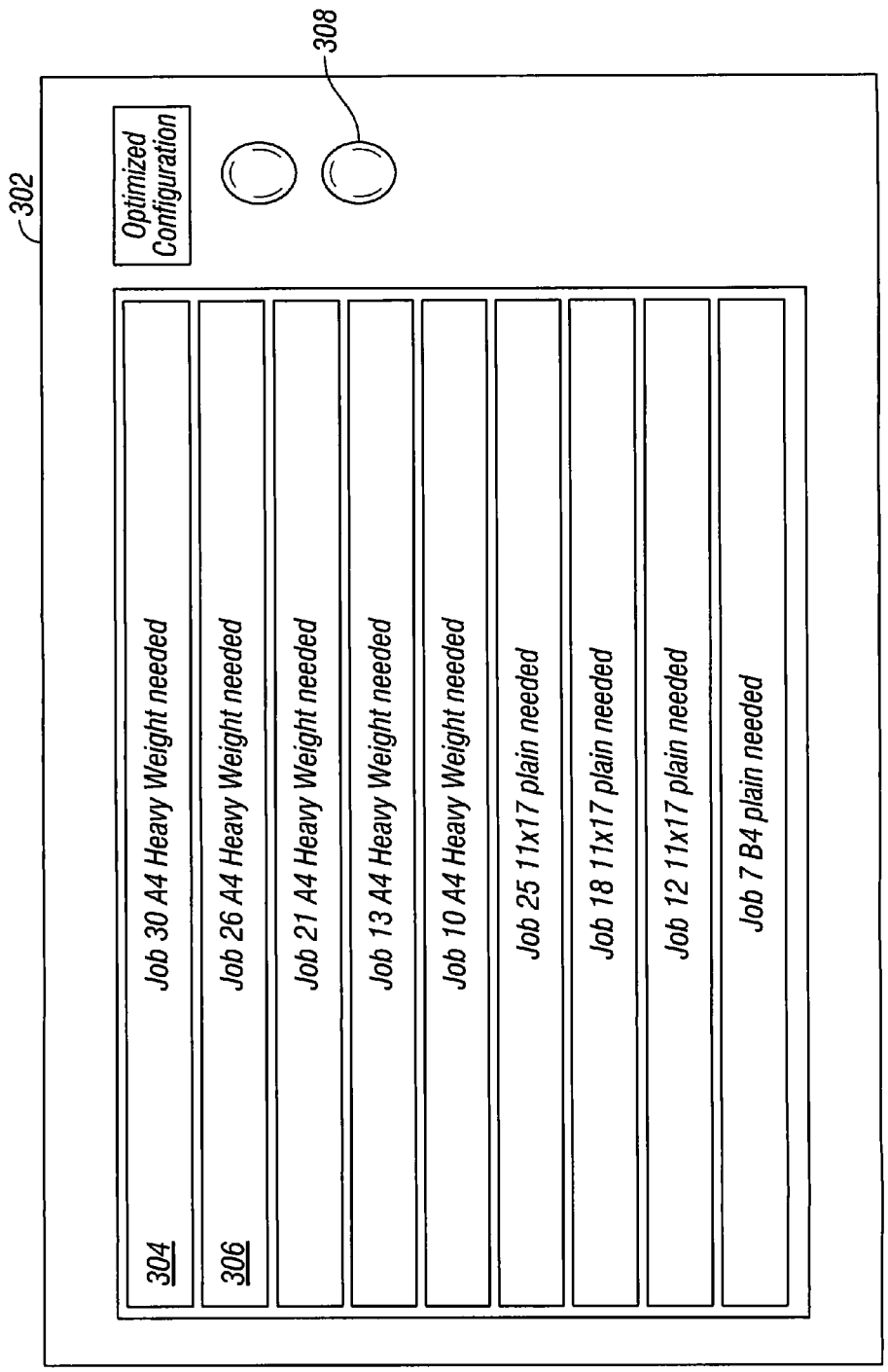
FIG. 3 is an example screen shot of a user interface for an operator of a printing process, according to an embodiment.

In an embodiment, configurations of sorted different print jobs may be presented to a user. An embodiment may be understood with reference to FIG. 3, a sample user interface of a queue of print jobs where each entry is an aggregation of print jobs in the wait queue that have a same color, paper size, and media. It should be appreciated that the particular details described in reference to FIG. 3 are by way of example only and are not meant to be limiting. The user interface shows aggregates of different color coding per media, size, and type. Examples of media type may include coated, uncoated, glossy, transparent, etc. The user interface further shows how the aggregates are sorted and displayed, e.g. with the larger number on top of the stack. Examples of attributes that a sorting process according to an embodiment may take into consideration, may include, but are not limited to, the following: paper size, feed direction (short edge or long edge), media type, and media weight.

Thus, in this example, different configurations of different print jobs may be presented to a user in a window 302 of an existing printing utility. In this example, the topmost configuration is print job #30 requiring A4 paper size and Heavy weight paper 304. The next configuration shows print job #26, also requiring A4 paper size and Heavy weight paper 306. Further, the top five buttons may be of the same color because they represent the same paper size and media, e.g. A4 Heavy Weight. That is, the jobs with the same color coding indicate jobs with at least some same attributes. It should be appreciated that color coding is only one way to indicate jobs with similar attributes. One skilled in the art may readily contemplate other indicators to show print jobs having the same attributes and still be within the scope of the invention. As well, the next three buttons may be of a different color than the first color because they represent a different configuration, e.g. 11×17 plain. And, the last button is of a third different color because it represents a third and different configuration, e.g. B4 plain. However, it should be appreciated that the sorting and arrangement of print jobs within the queue may be customized according to user preference, such as, but not limited to, based in part on business design and the like. The details presented above are for illustrative purposes only and are not meant to be limiting.

It should be appreciated that in an embodiment, the sort process may include sorting the print jobs based on the number of print jobs with a same configuration. For example, the sort process may include, but not be limited to, sorting print jobs based on the number of print jobs with a same paper size and media weight. In the example as described above for FIG. 3, where the first five jobs on top of window 302 are for heavyweight, when the processor receives an additional six jobs that require 11×17 plain, the processor automatically pushes the 11×17 plain configuration to the top of window 302 and pushes the A4 heavyweights configuration to the second place. A corresponding exemplary algorithm is described in further detail hereinbelow.

As another example, suppose 50 print jobs are sent to the print engine. Suppose further that the 50 print jobs are in different orders, e.g. 30 of which require letter paper size on plain media, 15 of which require 11×17 to a booklet tray with heavy weight cover, and 5 of which require tabs. Then, in accordance with the embodiment, the system sorts such print jobs and presents to the user the resources that are needed to print the jobs successfully. For example, the system may present to the user the information in the following order:

30 jobs requiring plain media;
15 jobs requiring heavy weight media (customer prompted to get heavy weight paper); and
5 requiring tabs.

An Exemplary Algorithm

An algorithm in accordance with an embodiment may be described as follows. As each job ticket is received by a print engine processor, the processor checks whether the print engine is configured for the job ticket. As an example, for a particular print job, a processor may check whether the print engine has the correct paper size and media. When the engine is configured for the job ticket, the processor causes the print engine to print the job ticket. Also, when the processor determines the engine is not configured for the present print job, e.g. determines the engine does not have the correct paper size and media, the processor puts the job ticket into the wait queue.

Then the wait queue is checked to determine whether it has an existing configuration that corresponds to the job ticket. When the wait queue does have the existing configuration, a processor associates the job ticket with that existing configuration, e.g. A4 heavyweight. When the wait queue does not have the existing configuration, the processor causes a configuration associated with the job ticket to be generated.

In an embodiment, one or more priorities may be determined for organizing the configurations in the wait queue. It should be appreciated that such determination may be made, in part, based on one or more attributes of the configurations. Such attributes may include, but are not limited to, print time, number of job tickets, number of pages, etc. For example, a processor may prioritize the configurations based on the largest number of job tickets. Thus, in the example, the configuration with the largest number of job tickets is pushed to the head of the wait queue; the configuration with the second largest number of job tickets is pushed to the second position in the wait queue, and so on.

As well, it should be appreciated that the one or more priorities for organizing the configurations may be set by an operator, may be automatically set by an accompanying algorithm, may be set to a default setting, and so on. For example, an embodiment may present a user interface to an operator by which the operator selects particular attributes for prioritizing the configurations, such as for example, number of job tickets or print time.

In an embodiment, a processor prioritizes the configurations, i.e. organizes the configurations in the wait queue according to the one or more priorities. It should be appreciated that the processor may prioritize the configurations in the wait queue at the request of an operator. For example, an operator may decide during a quiet period of no printing to change the current settings of the attributes of the configurations with respect to prioritization. For instance, the operator may uncheck the attribute, number of print jobs, and check the attribute, print time, to change the current priority for determining which configuration to print from the largest number of print jobs to printing print jobs based on descending order of the greatest printing time.

As well, it should be appreciated that the processor may prioritize the configurations in the wait queue on an automated basis. For example, the configurations in the wait queue may be prioritized automatically responsive to when a job ticket is added to the wait queue. Similarly, the configurations in the wait queue may be prioritized automatically responsive to when one or more job tickets is removed from the wait queue.

Thus, such exemplary algorithm as described herein, allows the user to print job tickets more efficiently without changing configurations or in the most efficient manner as desired by the operator. Put another way, embodiments described herein optimize the whole printing workflow. Thus, for example, for an operator, instead of printing five jobs and then having to change the configuration, embodiments herein allow the operator to print more jobs, e.g. 10 or 15, and then change the configuration at the print engine.

Thus, in accordance with the embodiment, the printing path is not blocked. Multiple users may each send different print jobs without running the risk of blocking other print jobs for which the print engine may be configured to print.

It further should be appreciated that the above-described embodiment may be very useful for small business with one or two engines, and the like. The following scenario illustrates an important use of embodiments described herein. It should be appreciated that the following is for illustrative purposes only and is not meant to be limiting. In this scenario, a small print shop may have two or three operators who, each, are receiving their respective and possibly different custom orders. Each operator sends their respective print jobs to the print engine, which proceeds to print such jobs. Such print jobs are automatically categorized and sorted according to the configurations or prioritized configurations of the printer. As well, the categorized and sorted print jobs are being printed according to the current configuration(s) of the printer, in accordance with embodiments described herein. At some point in time, there is a lull or a break in printing by the printer. Importantly and in accordance with embodiments herein, the operators may subsequently, after detecting the lull or break in printing, check the print queue, for example as presented in the user interface, and learn that they have 30 jobs that need a particular paper size. Thus, after learning that there are 30 jobs that need a particular paper size, the operators may add such paper to the printer, which then causes the printer to print the 30 jobs.

Similarly and as another example, a user may configure an embodiment in a way that the causes the system to prompt the user when a particular threshold is met. For example, the user may configure the system or algorithm to present him or her with a notification when the printer has received more than a particular number of jobs, e.g. 20, in the configuration. For instance, a button 308 on window 302 may flash a green light to indicate to the user that the system has met the requirement that the user has configured, e.g. when the printer has at least 20 jobs in the print queue. Thus, when the user observes that button 308 is flashing, the user may then place the correct media in the appropriate paper tray and change the engine configuration, which may cause the printer to print the corresponding 20 jobs held in the queue.

An Example Machine Overview

Figure 4:
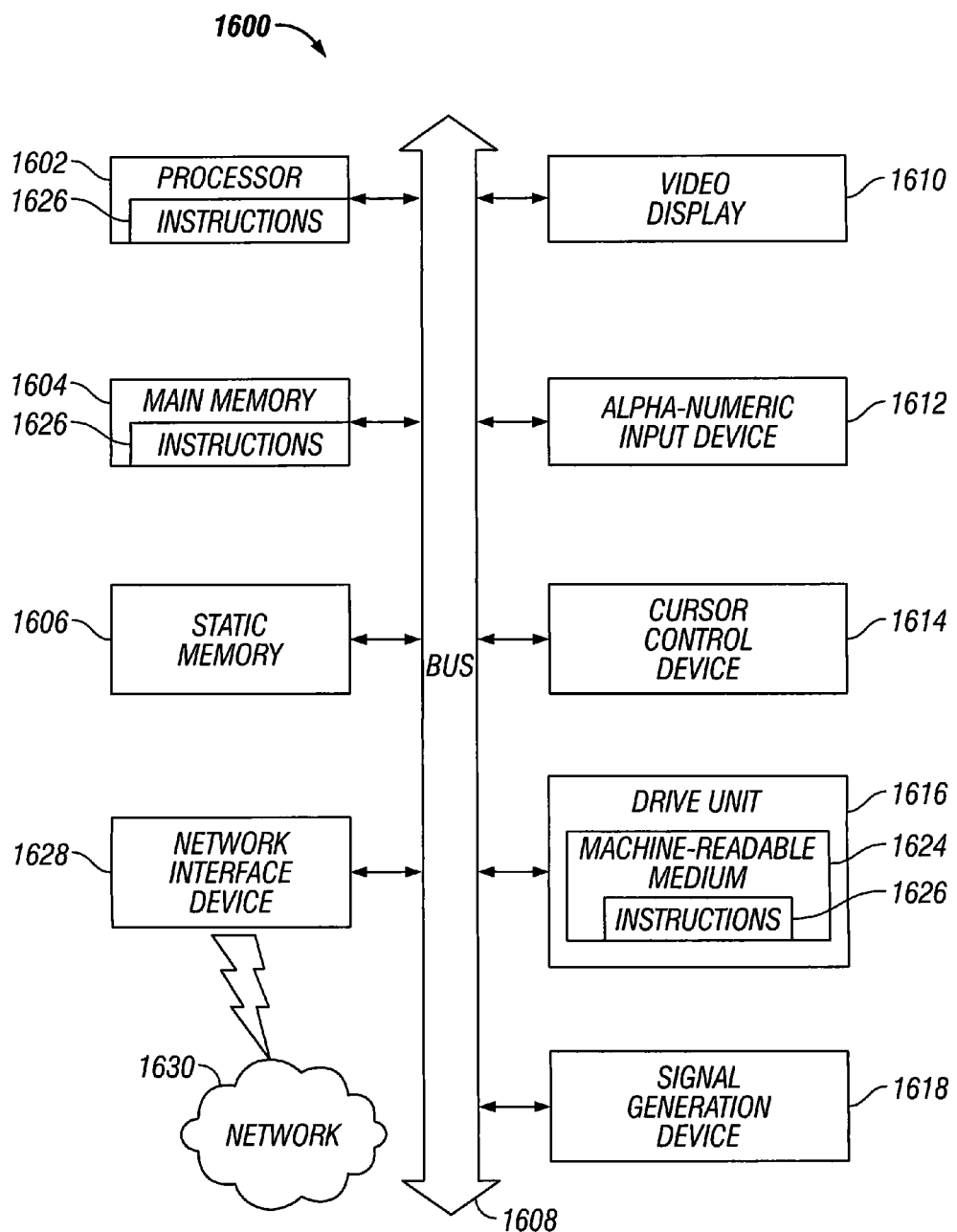
FIG. 4 is a block schematic diagram of a system in the exemplary form of a computer system according to an embodiment.

FIG. 4 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for engine optimization of a printer, comprising the steps of:
    receiving a print job having attributes;
    responsive to receiving the print job, parsing the print job and reading the attributes;
    responsive to reading the attributes, checking the printer and determining whether the printer is configured for printing said print job, said checking and determining based in part on said attributes;
    when the printer is configured for printing said print job, sending said print job to a print queue of said printer to cause said printer to print said print job;
    when the printer is not configured for printing said print job, re-routing and adding, automatically and without requiring user interaction, said print job to a wait queue, wherein the wait queue holds said print job;
    responsive to re-routing and adding said print job to said wait queue, sorting and organizing print jobs in said wait queue into one or more configurations of said printer, said sorting and organizing based in part on said attributes; and
    after a predetermined limit has been reached, issuing a notification that said predetermined limit has been reached or performing a predetermined course of action, wherein the predetermined limit is a time limit or an amount of print jobs that have collected, for a particular set of said sorted and organized print jobs in said wait queue and responsive to issuing the notification that said predetermined amount has been reached for said particular set, receiving a new configuration corresponding to said particular set, receiving an indication from said printer that said printer is configured for said particular set, and sending said print jobs in said particular set in said wait queue to said print queue;

wherein at least one step of the method is performed by at least one processor.

2. The method of claim 1, further comprising providing a user interface that displays a sorted list of aggregations of print jobs, wherein an aggregation of print jobs comprises print jobs of a same configuration.

3. The method of claim 1, wherein attributes comprise any of: paper size, media type, media weight, finishing options, number of copies, feed direction, staples, and information related to the data to be printed.

4. A method for engine optimization of a printer, comprising the steps of:

receiving a print job having attributes;

responsive to receiving the print job, parsing the print job and reading the attributes;

responsive to reading the attributes, checking the printer and determining whether the printer is configured for printing said print job, said checking and determining based in part on said attributes;

when the printer is configured for printing said print job, sending said print job to a print queue of said printer to cause said printer to print said print job;

when the printer is not configured for printing said print job, re-routing and adding, automatically and without requiring user interaction, said print job to a wait queue, wherein the wait queue holds said print job; and responsive to re-routing and adding said print job to said wait queue, sorting and organizing print jobs in said wait queue into one or more configurations of said printer, said sorting and organizing based in part on said attributes, said sorting and organizing print jobs in said wait queue into one or more configurations, further comprising:

checking the wait queue and determining whether it has an existing configuration that corresponds to said print job;

when the wait queue does have the existing configuration, associating said print job with the existing configuration;

when the wait queue does not have the existing configuration, generating a new configuration and associating said print job with said new configuration;

determining at least one attribute that is designated as a priority for a print engine;

responsive to determining the at least one attribute that is designated as a priority for the print engine, checking configurations in the wait queue and determining which configuration has the at least one attribute designated as a priority; and responsive to determining which configuration has the at least one attribute designated as a priority for the print engine, placing those print jobs of said configuration at the front of the wait queue wherein at least one step of the method is performed by at least one processor.

5. An apparatus for engine optimization of a printer, comprising:

a receiving processor for receiving a print job having attributes;

a parsing processor for parsing the print job responsive to receiving the print job and a reading processor for reading the attributes;

a checking and determining processor for checking the printer and determining whether the printer is configured for printing said print job, said checking and determining based in part on said attributes, responsive to reading the attributes;

a sending processor for sending said print job to a print queue of said printer to cause said printer to print said print job when the printer is configured for printing said print job; and a re-routing processor for re-routing and an adding processor for adding, automatically and without requiring user interaction, said print job to a wait queue when the printer is not configured for printing said print job, wherein the wait queue holds said print job;

a sorting and organizing processor for sorting and organizing print jobs in said wait queue into one or more configurations, responsive to re-routing and adding said print job to said wait queue, said sorting and organizing based in part on said attributes, and an issuing processor for issuing a notification that a predetermined limit has been reached or a performing processor for performing a predetermined course of action, responsive to re-routing and adding said print job to said wait queue and after the predetermined limit has been reached;

wherein the predetermined limit is a time limit or an amount of print jobs that have collected for a particular set of said sorted and organized print jobs in said wait queue and further comprising a configuration receiving processor for receiving a new configuration corresponding to said particular set, an indication receiving processor for receiving an indication from said printer that said printer is configured for said particular set, responsive to issuing a notification that said predetermined amount has been reached for said particular set, and a sending processor for sending said print jobs in said particular set in said wait queue to said print queue.

6. The apparatus of claim 5, further comprising a user interface that displays a sorted list of aggregations of print jobs, wherein an aggregation of print jobs comprises print jobs of a same configuration.

7. The apparatus of claim 5, wherein attributes comprise any of: paper size, media type, media weight, finishing options, number of copies, feed direction, staples, and information related to the data to be printed.

8. An apparatus for engine optimization of a printer, comprising:

a receiving processor for receiving a print job having attributes;

a parsing processor for parsing the print job responsive to receiving the print job and a reading processor for reading the attributes;

a checking and determining processor for checking the printer and determining whether the printer is configured for printing said print job, said checking and determining based in part on said attributes, responsive to reading the attributes;

a sending processor for sending said print job to a print queue of said printer to cause said printer to print said print job when the printer is configured for printing said print job; and a re-routing processor for re-routing and an adding processor for adding, automatically and without requiring user interaction, said print job to a wait queue when the printer is not configured for printing said print job, wherein the wait queue holds said print job;

a sorting and organizing processor for sorting and organizing print jobs in said wait queue into one or more configurations, responsive to re-routing and adding said print job to said wait queue, said sorting and organizing based in part on said attributes;

a configuration checking processor for checking the wait queue and determining whether it has an existing configuration that corresponds to said print job, responsive to said sorting and organizing print jobs in said wait queue into one or more configurations;

an associating processor for associating said print job with the existing configuration when the wait queue does have the existing configuration;

a generating processor for generating a new configuration and wherein the associating processor associates said print job with said new configuration when the wait queue does not have the existing configuration;

a determining processor for determining at least one attribute that is designated as a priority for a print engine;

a checking processor for checking configurations in the wait queue and determining which configuration has the at least one attribute designated as a priority for the print engine; and a placing processor for placing those print jobs of said configuration at the front of the wait queue, responsive to determining which configuration has the at least one attribute designated as a priority for the print engine.

9. A non-transitory computer readable medium having stored thereon a computer program comprising a program code which, when executed by a processor, performs the steps of:

receiving a print job having attributes;

responsive to receiving the print job, parsing the print job and reading the attributes;

responsive to reading the attributes, checking the printer and determining whether the printer is configured for printing said print job, said checking and determining based in part on said attributes;

when the printer is configured for printing said print job, sending said print job to a print queue of said printer to cause said printer to print said print job;

when the printer is not configured for printing said print job, re-routing and adding, automatically and without requiring user interaction, said print job to a wait queue, wherein the wait queue holds said print job;

responsive to re-routing and adding said print job to said wait queue, sorting and organizing print jobs in said wait queue into one or more configurations of said printer, said sorting and organizing based in part on said attributes; and after a predetermined limit has been reached, issuing a notification that said predetermined limit has been reached or performing a predetermined course of action, wherein the predetermined limit is a time limit or an amount of print jobs that have collected, for a particular set of said sorted and organized print jobs in said wait queue and responsive to issuing the notification that said predetermined amount has been reached for said particular set, receiving a new configuration corresponding to said particular set, receiving an indication from said printer that said printer is configured for said particular set, and sending said print jobs in said particular set in said wait queue to said print queue.

10. The non-transitory computer readable medium of claim 9, the program code further comprising providing a user interface that displays a sorted list of aggregations of print jobs, wherein an aggregation of print jobs comprises print jobs of a same configuration.

11. The non-transitory computer readable medium of claim 9, wherein attributes comprise any of: paper size, media type, media weight, finishing options, number of copies, feed direction, staples, and information related to the data to be printed.

12. A non-transitory computer readable medium having stored thereon a computer program comprising a program code which, when executed by a processor, performs the steps of:

receiving a print job having attributes;

responsive to receiving the print job, parsing the print job and reading the attributes;

responsive to reading the attributes, checking the printer and determining whether the printer is configured for printing said print job, said checking and determining based in part on said attributes;

when the printer is configured for printing said print job, sending said print job to a print queue of said printer to cause said printer to print said print job;

when the printer is not configured for printing said print job, re-routing and adding, automatically and without requiring user interaction, said print job to a wait queue, wherein the wait queue holds said print job;

responsive to re-routing and adding said print job to said wait queue, sorting and organizing print jobs in said wait queue into one or more configurations of said printer, said sorting and organizing based in part on said attributes;

said sorting and organizing print jobs in said wait queue into one or more configurations, further comprising:

checking the wait queue and determining whether it has an existing configuration that corresponds to said print job;

when the wait queue does have the existing configuration, associating said print job with the existing configuration;

when the wait queue does not have the existing configuration, generating a new configuration and associating said print job with said new configuration;

determining at least one attribute that is designated as a priority for a print engine;

responsive to determining the at least one attribute that is designated as a priority for the print engine, checking configurations in the wait queue and determining which configuration has the at least one attribute designated as a priority;

responsive to determining which configuration has the at least one attribute designated as a priority for the print engine, placing those print jobs of said configuration at the front of the wait queue.

* * * * *